United States Patent [19]

Sellier

[11] Patent Number: 4,527,354

[45] Date of Patent: Jul. 9, 1985

[54] IMPLANTABLE RESERVOIR FOR AUTOMATIC WATERING OF PLANTS

[76] Inventor: Michel Sellier, 3058 M St., NW., Washington, D.C. 20007

[21] Appl. No.: 520,541

[22] Filed: Aug. 5, 1983

[51] Int. Cl.³ .................................................. A01G 27/00
[52] U.S. Cl. .................................................. 47/81
[58] Field of Search .................................. 47/79-82, 47/48.5

[56] References Cited

U.S. PATENT DOCUMENTS

| | | | |
|---|---|---|---|
| 1,342,786 | 5/1920 | White | 47/81 |
| 3,576,088 | 4/1971 | Arca | 47/81 |
| 3,739,524 | 6/1973 | Rose | 47/38.1 |
| 3,871,131 | 3/1975 | Berglund | 47/38.1 |
| 3,958,366 | 5/1976 | Meyers | 47/38.1 |
| 4,171,593 | 10/1979 | Bigglestone | 47/79 |
| 4,183,175 | 1/1980 | Magee | 47/79 |
| 4,250,665 | 2/1981 | English et al. | 47/81 |

FOREIGN PATENT DOCUMENTS 2255843  7/1975  France ................................. 47/81

Primary Examiner—Robert E. Bagwill
Assistant Examiner—Danton DeMille
Attorney, Agent, or Firm—Lawrence Harbin

[57] ABSTRACT

A soil-implantable reservoir for use with conventional flower pots and the like for upgrading them to automatic watering capability. The reservoir is formed of a relatively thin, blown film plastic material and includes opposed, abutting insets integrally formed in the top and bottom surfaces thereof to help support the weight of soil when implanted. Water and/or plant nutrients are drawn from the implantable reservoir by capillary action of fibrous wicks which contact the soil and extend into the reservoir through orifices. A free-swinging feed tube rests in a filling orifice of the reservoir for replenishing the fluids therein. The feed tube may freely be positioned to match the incline, if any, of the side walls of the flower pot. Also, the feed tube includes a float gauge to permit visual observation of fluid level in the reservoir. A problem solved by the present invention is upgrading existing flower pots to automatic watering capability without the necessity of acquiring an entire assembly to do the same job.

9 Claims, 5 Drawing Figures

IMPLANTABLE RESERVOIR FOR AUTOMATIC WATERING OF PLANTS

BACKGROUND OF THE INVENTION

This invention pertains to horticultural devices, but more specifically, to an automatic watering device suitable for implantation in the soil of a variety of flower pots or the like.

Automatic watering devices for horticultural applications have been known in the art for some time. Such devices are useful for maintaining soil moisture and/or for feeding nutrients thereby to sustain the lift of a host plant in the soil. The most common type of automatic watering device consists of a soil container, e.g. a flower pot, which includes a built-in reservoir for holding water. The reservoir is filled through a feed tube and the fluid therein is typically drawn into the soil by way of capillary action through fibrous wicks, or by way of osmosis through a porous membrane. A major drawback, though, of the flower pot with the built-in reservoir is that it is expensive to fabricate and manufacture. In many instances, one does not desire to discard flower pots and planters already on hand in favor of replacing them with expensive self-watering devices for economic reasons or for reason of a desire to retain attractive planters.

In yet another type of self-watering device, a partition is introduced in the soil container to define at least a soil chamber and a water chamber. An obvious disadvantage of this combination is that the partition must necessarily be form-fitted with the soil container, and is therefore not suitable for being used with a variety of pot styles.

Prior art disclosures known by the inventor hereof which typify the aforementioned self-watering devices include U.S. Pat. No. 4,183,175 to Magee which shows a rigid supporting partition for defining a water chamber in the bottom of a soil container and a feed tube extending through the partition for providing means for replenishing water in the defined water chamber. Magee suffers the drawback that the partition must be specially form-fitted with the soil container and therefore, is expensive to fabricate and manufacture, as well as being limited in application since flower pots already on hand cannot be used if one is to employ the Magee device.

U.S. Pat. No. 1,342,786 illustrates an earlier type of automatic watering system wherein a conventionally appearing flower pot merely rests upon an externally disposed water reservoir containing an absorbent material in contact with the soil through an orifice located in the bottom of the flower pot. Assuming there is sufficient contact between the absorbent material and the soil, the host plant should receive an adequate supply of moisture and/or nutrients. Such a device can be cumbersome in handling, inefficient in water distribution, and somewhat restricted in the size of flower pots with which it may be adapted.

U.S. Pat. No. 4,250,665 to English et al. and U.S. Pat. No. 3,958,366 to Meyers both disclose water reservoirs specially adapted to a soil container with which it is attached, and further include wicks for drawing water from the reservoir through capillary action. It is quite apparent that they also suffer some of the same aforementioned drawbacks and disadvantages. Another feature ideally suited for such watering devices is shown in U.S. Pat. No. 4,171,593 to Bigglestone, U.S. Pat. No. 3,739,524 to Rose, and U.S. Pat. No. 3,871,131 to Berglund. These latter three references show a float gauge extending in what might be called a feed tube. The float gauge provides a visual indication of the water level in the reservoir.

The prior art is replete with examples of partitions, an integrally formed flower pot/water reservoir, and externally disposed reservoirs, but none of the prior art show an implantable reservoir having the features of the present invention.

SUMMARY OF THE INVENTION

In view of the foregoing, a primary objective of the present invention is to provide a soil-implantable reservoir for horticultural application, and in particular, for automatic watering and nutrient-feeding of plants.

Another objective of the present invention is to provide a soil-implantable reservoir for automatic watering of plants, e.g. maintaining soil moisture, that is suitable for being implanted in the soil of a variety of flower pot styles, and in particular, for a variety of different pot diameters and inclines of the side walls thereof.

A further objective of the present invention is to provide a soil-implantable reservoir which can be cheaply fabricated and manufactured from a blown film extrusion apparatus, and yet still possess the requisite strength and durability for supporting the weight of the soil in the container in which the reservoir is implanted.

A still further objective of the present invention is to provide a soil-implantable reservoir which, in combination with the above objectives, is fitted with wicks extending from the reservoir into the soil and which includes a disjointed feed tube suitable for being positioned to match the incline, if any, of the side walls of the soil container.

In accordance with the foregoing and other objectives, a preferred embodiment of the invention comprises a thin-walled reservoir suitable for being implanted in the soil of a soil container which hosts a plant, wherein the reservoir includes a series of wicks extending externally of the top surface thereof into the internal chamber of the reservoir for supplying fluids and/or nutrients to the soil by way of capillary action. The reservoir also includes a free-swinging feed tube extending substantially vertically into the reservoir in a fashion that it may readily be positioned to match the incline of the side walls of the soil container. Further, a support structure is integrally formed with the reservoir to aid in sustaining the weight of the soil located thereupon when implanted in a soil container. The support structure preferably comprises abutting insets formed in the respective top and bottom surfaces of a relatively thin, blown film extruded reservoir which can economically be manufactured. In a refinement of the preferred embodiment, the feed tube includes a float gauge disposed therein which float gauge has indicia means for visually indicating the level of the water in the reservoir.

Over the prior art, the present invention is advantageous in that existing flower pots and planters can be retained, rather than discarded, in order to upgrade their capacity to provide automatically watering and/or nutrient feeding. Moreover, a variety of pot styles, regardless of the diameter of the base thereof (assuming the diameter of the base at least exceeds the diameter of the implantable reservoir) or incline of side walls (if inclined) can be fitted with the implantable reservoir of present invention. Furthermore, the wicks provide good soil contact and the float gauge is convenient. Depending upon the ambient conditions, a typical planter equipped with the inventive reservoir need only be watered once within a four to eight week period. Such a watering frequency is highly desirable in offices or at home, and especially so during long periods of absences, such as vacations.

Other features, aspects and advantages of the invention become readily apparent upon review of the succeeding disclosure taken in connection with the accompanying drawings. The invention though is pointed out with particularity by the appended claims.

DESCRIPTION OF ILLUSTRATIVE EMBODIMENTS

Figure 1:
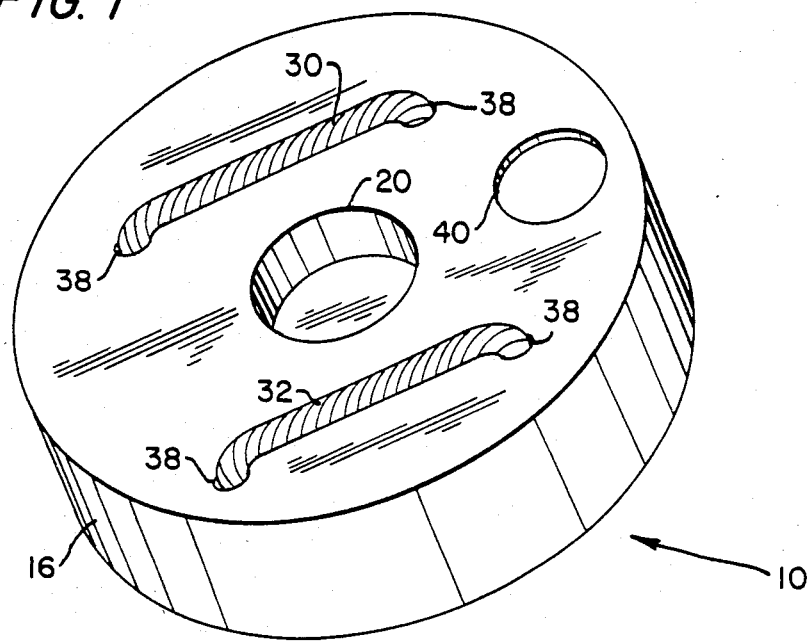
FIG. 1 depicts the inventive soil-implantable reservoir in perspective view.
Figure 2:
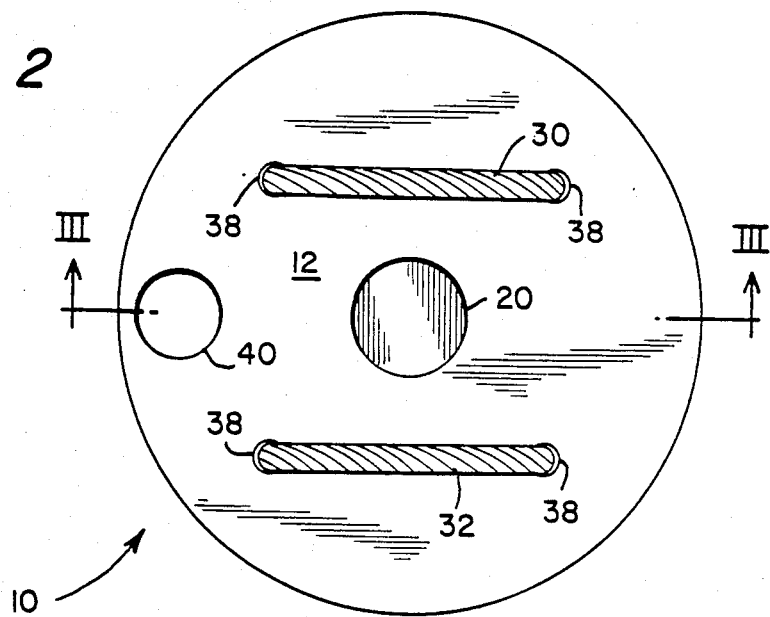
FIG. 2 is a top plan view of the soil-implantable reservoir of FIG. 1.
Figure 3:
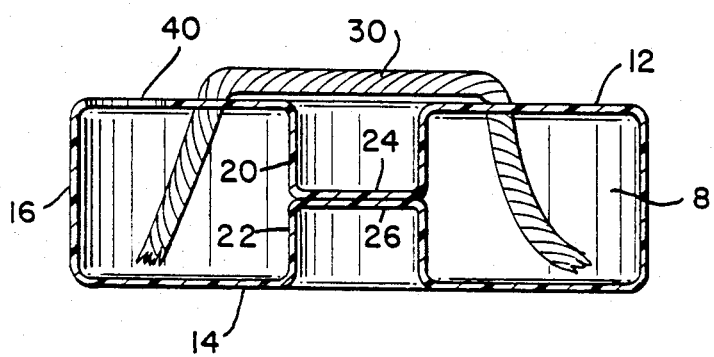
FIG. 3 is a cross-sectional side view along line III—III of the soil-implantable reservoir of FIG. 2.

A primary feature of the present invention lies in its implantability. The invention, as depicted in FIGS. 1, 2 and 3 essentially comprises a reservoir specially suited for being implanted and for providing water and/or nutrients to a plant in a soil container.

As shown in the drawings, a soil-implantable reservoir 10 is constituted by a top surface 12, a bottom surface 14, and a side wall 16 which interconnects the top and bottom surfaces 12 and 14 thereby to form a chamber 18 for storing fluids. The side wall 16 and the surfaces 12 and 14 preferably are integrally formed by a conventional blown film extrusion process whereby it can be manufactured very economically from a relatively thin plastic material, such as polystyrene. Blown film and/or extruder devices are well known in the art and, for that reason, are not described here. When manufactured in this manner, a user can easily justify a small expenditure for the inventive implantable reservoir 10 to upgrade the capability of often expensive soil containers (flower pots, planters, and the like) to an automatic watering device without discarding the same. This is a primary advantage over prior art devices wherein to attain automatic watering, the entire planter or flower pot must be replaced.

When implanted, the reservoir 10 supports the weight of the soil in the soil container. Because the reservoir materials are relatively thin for economy, it is subject to collapsing under the weight of the soil. To overcome the propensity to collapse, a supporting structure comprising a pair of abutting insets 20 and 22 is integrally formed with the top and bottom surfaces 12 and 14 during the preferable flow film extrusion process. The portions 24 and 26 of respective insets 20 and 22 substantially abut each other to that, when implanted, the supporting structure carries a good portion of the weight of the soil thereby to maintain the internal volumetric space of the chamber 18. The supporting structure enables, in this case, the circular reservoir to have a larger diameter for a given material thickness of the reservoir.

Although a circular soil-implantable reservoir is shown, it may in fact take on a variety of shapes, in which case the supporting structure may take a form suitable to the shape and character of the reservoir. Alternatively, the supporting structure may simply comprise spacers disposed in the chamber 18 to hold apart the top and bottom surfaces 12 and 14 under the potential weight of the soil, or may comprise integrally formed insets in the side wall 16 and/or top and bottom surfaces 12 and 14 near the side wall 16.

When implanted, fluids preferably are drawn from the reservoir to the soil by way of capillary action of fibrous wicks 30 and 32 which extend across the top surface 12 through fluid supply orifices 38 into the internal chamber 18 of the reservoir. Any cellular or fibrous material may constitute the wicks 30 and 32, and any number of wicks may be used, although two are shown. As known in the art, an equilibrium condition between the moisture content of the wick and the moisture content of the soil will be maintained. As the soil is drained of fluids by a host plant or through evaporation, the fluid is replaced with that which is contained in the reservoir through the wicks as the exchange medium. The fluid itself is water and/or plant nutrients, if desired.

Figure 4:
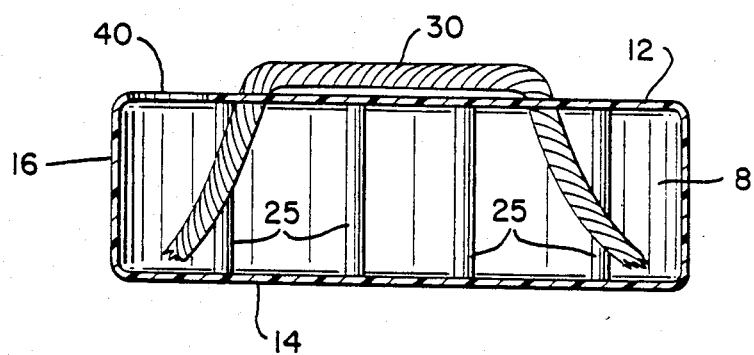
FIG. 4 is a cross-sectional side view of an alternative embodiment of a support structure which may be incorporated with the soil-implantable reservoir of FIG. 2.

The reservoir may be fabricated with other forms of support structures to prevent it from collapsing under the weight of the soil when implanted. For example, studs 25 are depicted in FIG. 4 which interconnect the top and bottom surfaces 12 and 14 might be employed, instead of the inset 20 and 22 shown with respect to FIG. 3. In this case, reservoir holds more fluids.

Figure 5:
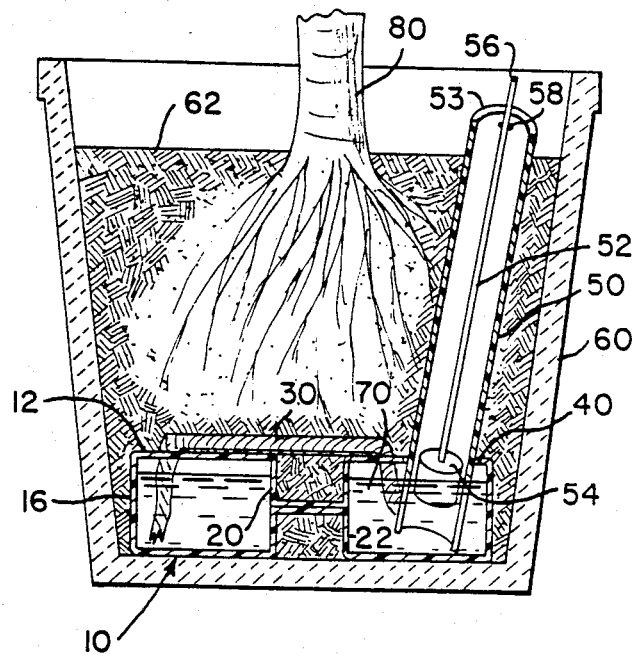
FIG. 5 shows the inventive soil-implantable reservoir together with a filling tube and a float gauge, in combination with a soil container hosting a plant.

Fluids are replenished through a filling orifice 40 in which a feed tube 50 extends, as now depicted in FIG. 5. FIG. 5 shows the implanted condition of the reservoir 10. The feed tube 50 is not attached to the reservoir 10, but instead, extends through the filling orifice and rests therein so that it freely swings to be positioned, if necessary, slightly off of a perpendicular relation with the top surface 12 of the reservoir 10 to match the slight incline of the side wall of the soil container 60. The top opening 53 of the feed tube 50 protrudes upwardly at least to reach the level of the soil 62. Water and/or plant nutrients are poured into the opening 53 to fill the reservoir to a level, such as the indicated fluid level 70. In the preferred embodiment, the feed tube 50 carries a float gauge constituted by an elongated stem 54 connected to a float element 56. The float element 56 is buoyant upon the surface 70 of the fluid so that the protruding portion 56 of the stem can be visually observed to indicate fluid level. The stem portion 56 also carries a notch 58 which when flush with the opening 56 indicates a full level in the reservoir.

In the implanted condition, the supporting structure comprising the side wall 16 and the pair of abutting insets 20 and 22 support the weight of the soil 62 placed upon the top surface 12 of the reservoir. The roots of plant 80 then draws water and/or nutrients through the soil which are replenished by the fluids in the reservoir 10 by way of capillary action of the wicks 30 and 32.

The length of the feed tube 50 and stem 52 are selected to accommodate the dimensions of the average soil container. For a soil container of a non-standard size, the reservoir 10 may be implanted at a depth in the soil where the opening 53 reaches the top of the soil level. This depth, of course, is determined by the length of the feed tube 50. The diameter of the reservoir need not necessarily correspond in diameter to the diameter of the soil container so long as the former is smaller. For example, if the diameter of the reservoir is one-half that of the soil container, one merely implants the reservoir 10 off-center so that the feed tube emanates from the soil surface at or near the periphery of the container. For these and other reasons, it is seen that the inventive soil-implantable reservoir is versatile. Of course, in practice, the reservoir is produced in a few different sizes to accommodate a large number of pot styles and sizes.

The reservoir preferably is implanted at or near the bottom of the soil container 60 and its size relative to the size of the soil container 60 is not important for adaptability, but instead, only to longevity of periods between fillings. The periods between filling the reservoir depend, among other things, upon the type of host plant 80 and the ambient condition of the location of the plant. In a high-humidity environment, for example, the host plant 80 may absorb water from the ambient or by osmosis, and therefore, may only drain the reservoir very slowly. In another instance, where the ambient environment is very dry, the reservoir is quickly drained. In actual practice, using a reservoir which is eight inches in diameter disposed in a comparably sized soil container and host plant, filling cycles are approximately three to eight weeks.

The foregoing embodiment is illustrative of an example of an apparatus for carrying out the spirit and intent of the invention. Several modifications and changes can no doubt be made by those skilled in the art. Accordingly, it is the intent of the inventor to include all such embodiments, however modified or varied, in the scope of the appended claims.

What is claimed as new and desired to be secured by Letters Patent is:

1. A soil-implantable reservoir for implantation in the soil of a soil container which hosts a plant comprising:
    implantable means having a top surface, a bottom surface, and side wall means for interconnectng said top and bottom surfaces for defining a chamber therein for storing fluids, said top surface and bottom surface being formed of a thin material and said top surface including a filling orifice and at least one fluid supply orifice;
    support means integrally formed with said implantable means for providing support for the weight of the soil when implanted in said soil container, said support means comprising at least one pair of opposed insets disposed in the respective top and bottom surfaces of the implantable means wherein said opposed insets substantially abut against each other thereby to maintain separation between the respective top and bottom surfaces under the weight of the soil when implanted;
    said implantable means and said support means being constituted by a thin plastic material formed together in a unitary structure by a blown film process to enable said insets to be formed as contoured surfaces for supporting said reservoir;
    capillary means extending through said fluid supply orifice and contacting said soil for drawing fluids from said implantable means and for supplying the fluids to said soil; and
    means for filling said implantable reservoir with fluids.

2. An implantable reservoir as recited in claim 1 further including means for indicating the level of fluids contained in said implantable means.

3. An implantable reservoir as recited in claim 2 wherein said capillary means comprises at least one fibrous wick extending between the top surface of said implantable means and the internal chamber thereof.

4. In combination with a soil container which hosts a plant in soil contained therein, the improvement comprising:
    implantable means having a top surface, a bottom surface, and side wall means for interconnecting said top and bottom surfaces for defining a chamber therein for storing fluids, said top surface and bottom surface being formed of a thin material and said top surface including a filling orifice and at least one fluid supply orifice;
    support means integrally formed with said implantable means for providing support for the weight of the soil when implanted in said soil container, said support means comprising at least one pair of opposed insets disposed in the respective top and bottom surfaces of the implantable means wherein said opposed insets substantially abut against each other thereby to maintain separation between the respective top and bottom surfaces under the weight of the soil when implanted;
    said implantable means and said support means being constituted by a thin plastic material formed together in a unitary structure by a blown film process to enable said insets to be formed as contoured surfaces for supporting said reservoir;
    capillary means extending through said fluid supply orifice and contacting said soil for drawing fluids from said implantable means and for supplying the fluids to said soil; and
    filling means for filling said implantable reservoir with fluids.

5. The improvement as recited in claim 4 wherein said capillary means comprises at least one fibrous wick extending between the top surface of said implantable means and the internal chamber thereof.

6. The improvement as recited in claim 5 wherein said filling means comprises a rigid feed tube loosely disposed in said filling orifice and extending substantially vertically from said implantable means, and wherein said rigid feed tube includes a float gauge disposed therein for indicating the fluid level in said reservoir.

7. A soil-implantable reservoir for implantation in the soil of a soil container which hosts a plant comprising:
    implantable means having a top surface, a bottom surface, and side wall means for interconnecting said top and bottom surfaces for defining a chamber therein for storing fluids, said top surface and bottom surface being formed of a thin material and said top surface including a filling orifice and at least one fluid supply orifice;
    support means integrally formed with said implantable means for providing support for the weight of the soil when implanted in said soil container, said support means comprising at least one pair of opposed insets disposed in the respective top and bottom surfaces of the implantable means wherein said opposed insets substantially abut against each other thereby to maintain separation between the respective top and bottom surfaces under the weight of the soil when implanted;

said implantable means and said support means being constituted by a thin plastic material formed together in a unitary structure by a blown film process to enable said insets to be formed as contoured surfaces for supporting said reservoir;

capillary means extending through said at least one fluid supply orifice and contacting said soil for drawing fluids from said implantable means and for supplying the fluids to said soil;

a free-swinging, rigid feed tube adapted to be disposed in said filling orifice and extending substantially vertically therefrom; and a float gauge including indicia means disposed in said rigid feed tube for providing an indication of fluid level in said implantable means.

8. An implantable reservoir as recited in claim 7 wherein said capillary means comprises at least one fibrous wick extending between the top surface of said implantable means and the internal chamber thereof.

9. An implantable reservoir as recited in claim 8 wherein said implantable means is integrally formed of a thin plastic material by a blown film extrusion process.

* * * * *